(12) United States Patent
Ozaki

(10) Patent No.: US 9,471,977 B2
(45) Date of Patent: Oct. 18, 2016

(54) IMAGE PROCESSING DEVICE, IMAGE PROCESSING SYSTEM, AND NON-TRANSITORY COMPUTER READABLE MEDIUM

(71) Applicant: FUJI XEROX CO., LTD., Tokyo (JP)

(72) Inventor: Ryota Ozaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/718,834

(22) Filed: May 21, 2015

(65) Prior Publication Data

US 2015/0254848 A1 Sep. 10, 2015

Related U.S. Application Data

(63) Continuation of application No. PCT/JP2013/066367, filed on Jun. 13, 2013.

(30) Foreign Application Priority Data

Dec. 7, 2012 (JP) .................................. 2012-267987

(51) Int. Cl.
*G06K 9/00* (2006.01)
*G06T 7/00* (2006.01)
(Continued)

(52) U.S. Cl.
CPC ........... *G06T 7/0012* (2013.01); *G02B 21/244* (2013.01); *G06K 9/0014* (2013.01); *G06K 9/00147* (2013.01); *G06T 7/0081* (2013.01); *G06K 9/4642* (2013.01); *G06K 2207/1012* (2013.01); *G06T 2207/10004* (2013.01); *G06T 2207/10056* (2013.01);
(Continued)

(58) Field of Classification Search
CPC combination set(s) only.
See application file for complete search history.

(56) References Cited

U.S. PATENT DOCUMENTS 6,473,176 B2 * 10/2002 Basiji .................... G01J 3/2803
356/326
7,079,675 B2 * 7/2006 Hamer ............... G06K 9/00127
128/922

(Continued)

FOREIGN PATENT DOCUMENTS

| JP | 2004-248619 A | 9/2004 |
|----|---------------|--------|
| JP | 4346923 B2 | 10/2009 |
| WO | 2011/114736 A1 | 9/2011 |

OTHER PUBLICATIONS

Written Opinion (PCT/ISA/237) dated Jul. 30, 2013, issued by the International Searching Authority in counterpart International Application No. PCT/JP2013/066367.

(Continued)

*Primary Examiner* — Anand Bhatnagar
(74) *Attorney, Agent, or Firm* — Sughrue Mion, PLLC

(57) ABSTRACT

There is provided an image processing device. Pixels serving as a candidate for a nucleus are extracted from pixels included in a captured image obtained by imaging a sample including a target cell having the nucleus. A connected pixel group constituted of adjacent connected pixels is extracted from the extracted pixels. A value indicating a possibility that the target cell is included within a region surrounding the connected pixel group is determined. The value indicates the possibility being determined based on a value obtained by aggregating image feature amounts expressing luminance gradients determined based on luminance distribution with respect to a blue component within different partial regions included in the region surrounding the connected pixel group without performing normalization on each partial region.

9 Claims, 8 Drawing Sheets

(51) Int. Cl.
*G02B 21/24* (2006.01)
*G06K 9/46* (2006.01)

(52) U.S. Cl.
CPC ............... *G06T 2207/10152* (2013.01); *G06T 2207/20076* (2013.01); *G06T 2207/20081* (2013.01); *G06T 2207/30004* (2013.01); *G06T 2207/30024* (2013.01); *G06T 2207/30196* (2013.01)

(56) References Cited

U.S. PATENT DOCUMENTS

| | | | | |
|---|---|---|---|---|
| 7,684,596 | B2* | 3/2010 | Watson | G06K 9/00127 |
| | | | | 382/128 |
| 7,760,927 | B2* | 7/2010 | Gholap | G06K 9/00127 |
| | | | | 128/922 |
| 8,284,363 | B2* | 10/2012 | Nakao | G02F 1/133707 |
| | | | | 349/124 |
| 8,340,389 | B2* | 12/2012 | Kincaid | G06K 9/00147 |
| | | | | 382/133 |
| 8,515,150 | B2* | 8/2013 | Mangoubi | G06K 9/0014 |
| | | | | 382/133 |
| 9,014,444 | B2* | 4/2015 | Liu | G06K 9/0014 |
| | | | | 382/128 |
| 2002/0186875 | A1* | 12/2002 | Burmer | G06K 9/66 |
| | | | | 382/133 |
| 2003/0165263 | A1 | 9/2003 | Hamer et al. | |
| 2006/0013455 | A1* | 1/2006 | Watson | G06K 9/0014 |
| | | | | 382/128 |
| 2006/0188140 | A1* | 8/2006 | Gholap | G06K 9/00127 |
| | | | | 382/133 |
| 2006/0251294 | A1* | 11/2006 | Soll | G06T 7/0012 |
| | | | | 382/107 |
| 2009/0029408 | A1* | 1/2009 | LaPan | G01N 33/56966 |
| | | | | 435/34 |
| 2010/0040276 | A1* | 2/2010 | Zerfass | G06T 7/0012 |
| | | | | 382/133 |
| 2010/0128988 | A1* | 5/2010 | Kincaid | G06K 9/6253 |
| | | | | 382/199 |
| 2011/0110577 | A1* | 5/2011 | Mangoubi | G06K 9/0014 |
| | | | | 382/133 |
| 2011/0123090 | A1 | 5/2011 | Zerfass et al. | |
| 2012/0051638 | A1 | 3/2012 | Kawai et al. | |
| 2012/0276578 | A1* | 11/2012 | Stringari | G01N 21/6408 |
| | | | | 435/34 |
| 2014/0112568 | A1* | 4/2014 | Liu | G06K 9/0014 |
| | | | | 382/133 |

OTHER PUBLICATIONS

Ichida, et al.; "Auto-extraction of Nucleated Red Blood Cells from Massive Microscopy Images", IEICE Technical Report, Medical Imaging, Jan. 2008, vol. 107, No. 461, 7 pages total.

Nakano, et al.; "Detection of Traffic Signal Region Using Support Vector Machine with Shape and Color Information", Forum on Information Technology, Sep. 2011, vol. 10, No. 3, 3 pages total.

Matsugami, "Ninshiki Kenshutsu", Image Laboratory, 2010, vol. 21, No. 12, 14 pages total.

Ehara, et al.; "Detecting a Human Employing Reduced Number of Weak-classifiers Using a Human Model", 18th Symposium on Sensing via Image Information, Jun. 2012, 6 pages total.

Mikami, et al.; "Image Classification Using Multiple Subspaces", ITE Technical Report, Aug. 2011, vol. 35, No. 33, 3 pages total.

Hotta, "Compound Linear Subspace Classifier Deriving from Compound Decision Problem", IEICE Technical Report, Dec. 2010, vol. 110, No. 330, 7 pages.

Search Report dated Jul. 30, 2013, issued by the International Searching Authority in counterpart International Application No. PCT/JP2013/066367.

Written Opinion dated Jul. 30, 2013, issued by the International Searching Authority in counterpart International Application No. PCT/JP2013/066367.

European Search Report issued European Patent Office in Application No. 13860658.7 dated Aug. 31, 2016.

Fang, et al. "Road-Sign Detection and Tracking", IEEE Transactions on Vehicular Technology, vol. 52, No. 5, pp. 1329-1341, Sep. 2003.

* cited by examiner

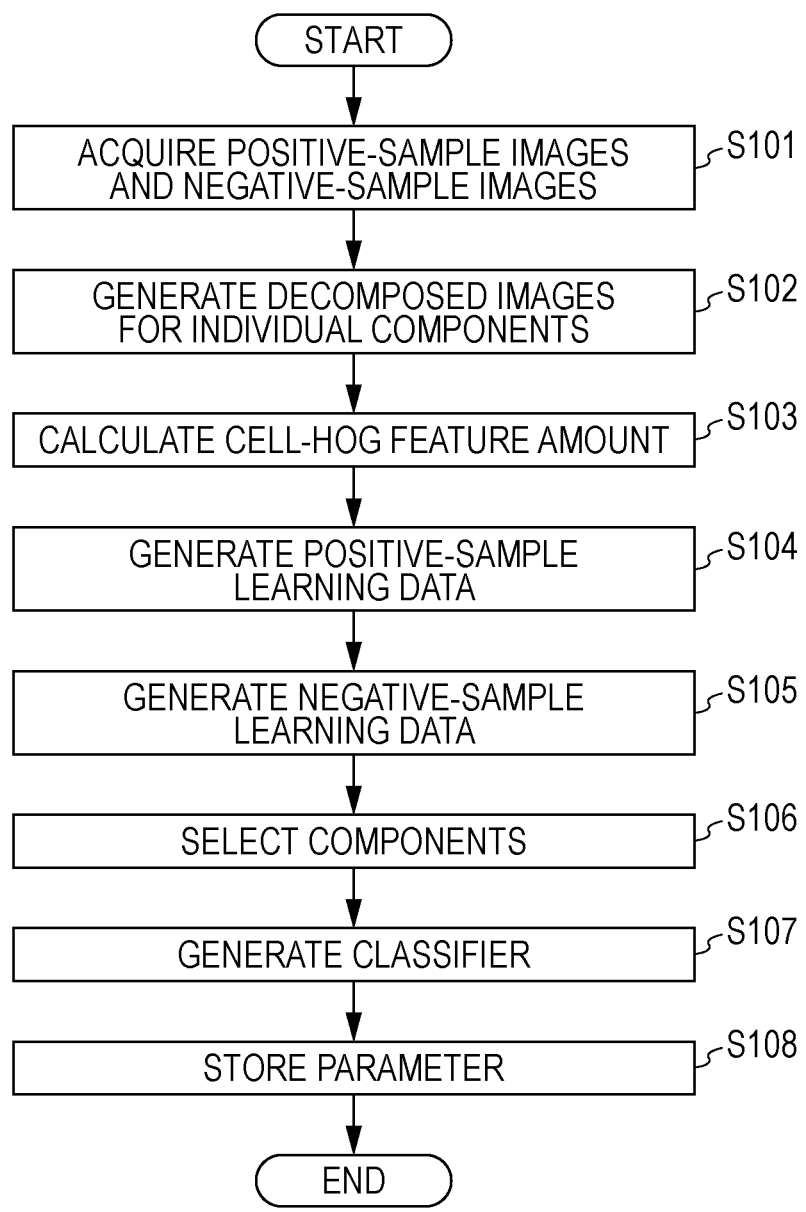

IMAGE PROCESSING DEVICE, IMAGE PROCESSING SYSTEM, AND NON-TRANSITORY COMPUTER READABLE MEDIUM

CROSS-REFERENCE TO RELATED APPLICATIONS

This is a continuation of International Application No. PCT/JP2013/066367 filed on Jun. 13, 2013, and claims priority from Japanese Patent Application No. 2012-267987, filed on Dec. 7, 2012.

TECHNICAL FIELD

The present invention relates to image processing devices, image processing systems, and non-transitory computer readable medium.

SUMMARY

According to an aspect of the exemplary embodiments of the present invention, there is provided an image processing device comprising: a pixel extracting unit that extracts pixels serving as a candidate for a nucleus from pixels included in a captured image obtained by imaging a sample including a target cell having the nucleus; a connected-pixel-group extracting unit that extracts a connected pixel group constituted of a predetermined number of adjacent connected pixels or more from the pixels extracted by the pixel extracting unit; and a determining unit that determines a value indicating a possibility that the target cell is included within a region surrounding the connected pixel group extracted by the connected-pixel-group extracting unit, the value indicating the possibility being determined based on a value obtained by aggregating image feature amounts expressing luminance gradients determined based on luminance distribution with respect to a blue component within multiple different partial regions included in the region surrounding the connected pixel group extracted by the connected-pixel-group extracting unit without performing normalization on each partial region, the value indicating the possibility being determined also based on a condition for an image feature amount machine-learned based on a value obtained by aggregating image feature amounts expressing luminance gradients determined based on luminance distribution with respect to a blue component within partial regions included in a region occupied by a sample image without performing normalization on each partial region.

BRIEF DESCRIPTION OF DRAWINGS

Exemplary embodiments of the present invention will be described in detail based on the following figures, wherein:

FIG. 9 is a flowchart illustrating an example of the flow of a process performed by the image processing device according to an embodiment of the present invention;

DETAILED DESCRIPTION

An embodiment of the present invention will be described below with reference to the drawings.

Figure 1:
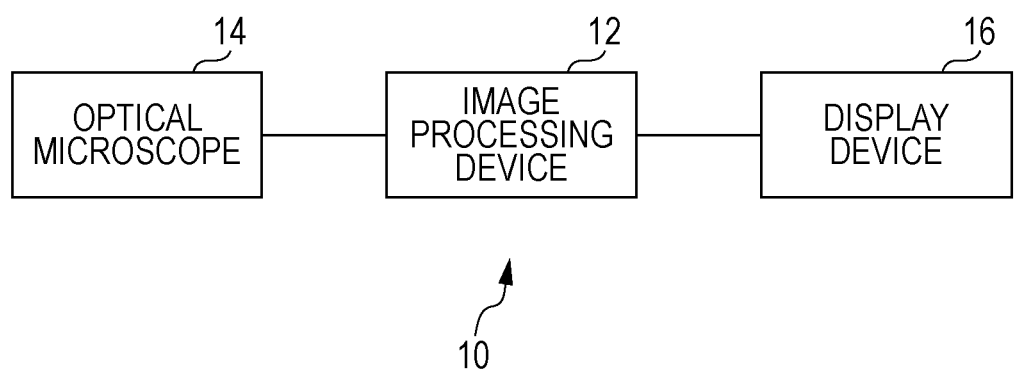
FIG. 1 is a configuration diagram illustrating an example of an image processing system according to an embodiment of the present invention.

FIG. 1 is a configuration diagram illustrating an example of an image processing system 10 according to this embodiment. As shown in FIG. 1, the image processing system 10 according to this embodiment includes an image processing device 12, an optical microscope 14, and a display device 16. The image processing device 12 is connected to the optical microscope 14 and the display device 16 by, for example, cables so as to communicably exchange information with one another.

For example, the optical microscope 14 according to this embodiment captures an image of a sample on stained glass disposed on a sample base by using a charge-coupled device (CCD) camera via an optical system, such as an objective lens. In this embodiment, the sample used is obtained by applying the maternal blood onto slide glass and then applying May-Giemsa stain thereto. Thus, fetus-derived nucleated red blood cells (NRBCs) in the maternal blood are dyed in violet-blue color. The NRBCs will be referred to as "target cells" hereinafter. As described above, each target cell has a nucleus.

The image processing device 12 acquires the captured image obtained by the optical microscope 14 and searches for a target cell within the captured image. The searching process performed in the image processing device 12 will be described later.

In this embodiment, for example, the display device 16 displays an image generated by the image processing device 12. For example, the display device 16 displays the captured image obtained by the optical microscope 14 as well as a search result obtained by the image processing device 12.

Figure 2:
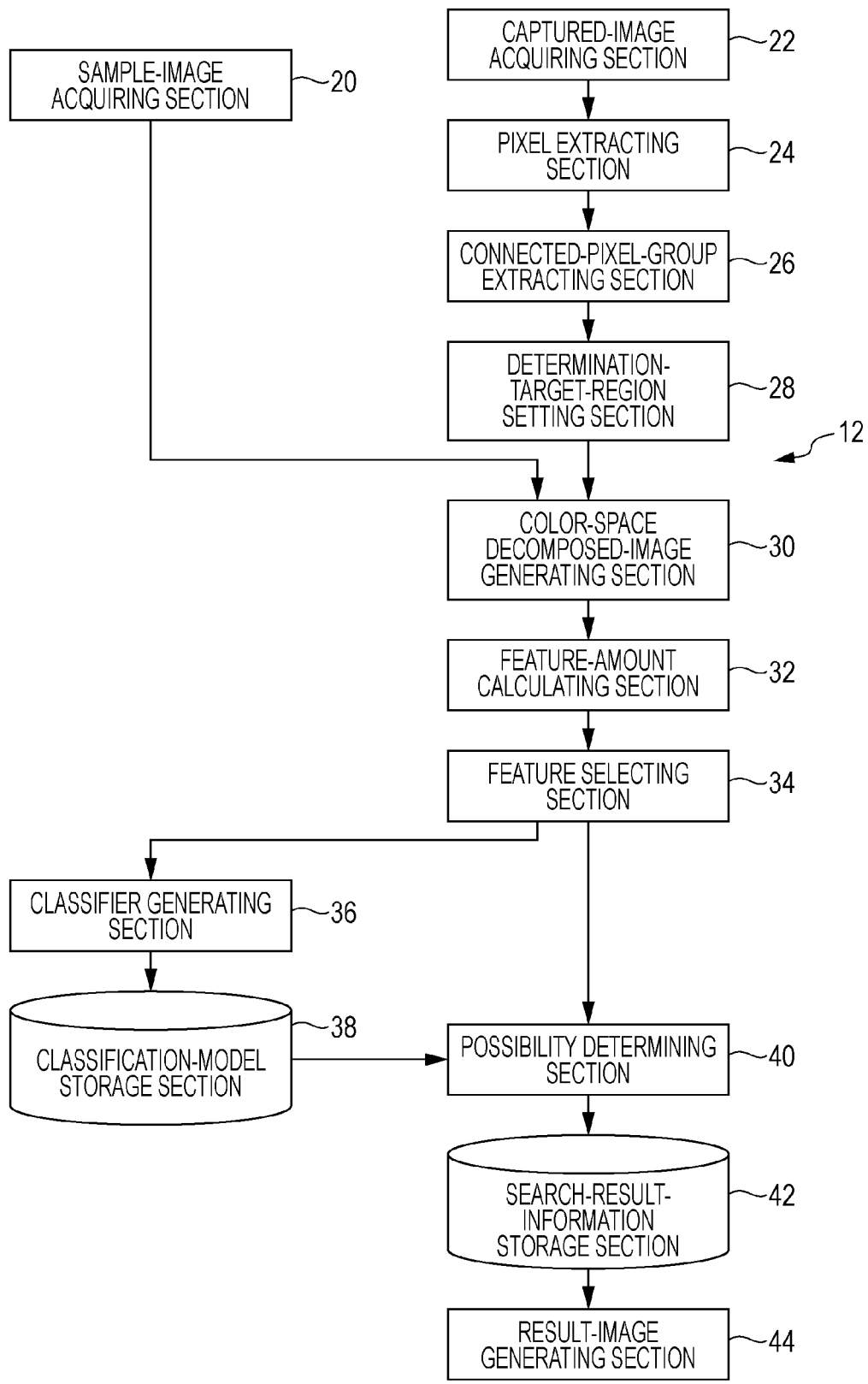
FIG. 2 is a functional block diagram illustrating an example of functions realized by an image processing device according to an embodiment of the present invention.

FIG. 2 is a functional block diagram illustrating an example of functions realized by the image processing device 12 according to this embodiment. As shown in FIG. 2, the image processing device 12 according to this embodiment functionally includes, for example, a sample-image acquiring section 20, a captured-image acquiring section 22, a pixel extracting section 24, a connected-pixel-group extracting section 26, a determination-target-region setting section 28, a color-space decomposed-image generating section 30, a feature-amount calculating section 32, a feature selecting section 34, a classifier generating section 36, a classification-model storage section 38, a possibility determining section 40, a search-result-information storage section 42, and a result-image generating section 44. These functions are realized by causing a controller of the image processing device 12 to execute a program that is installed in the image processing device 12, which is a computer, and that includes commands corresponding to these functions. This program is supplied to the image processing device 12 via a computer-readable information storage medium, such as an optical disk, a magnetic disk, a magnetic tape, a magneto-optical disk, or a flash memory, or via a communication means, such as the Internet.

Figure 3:
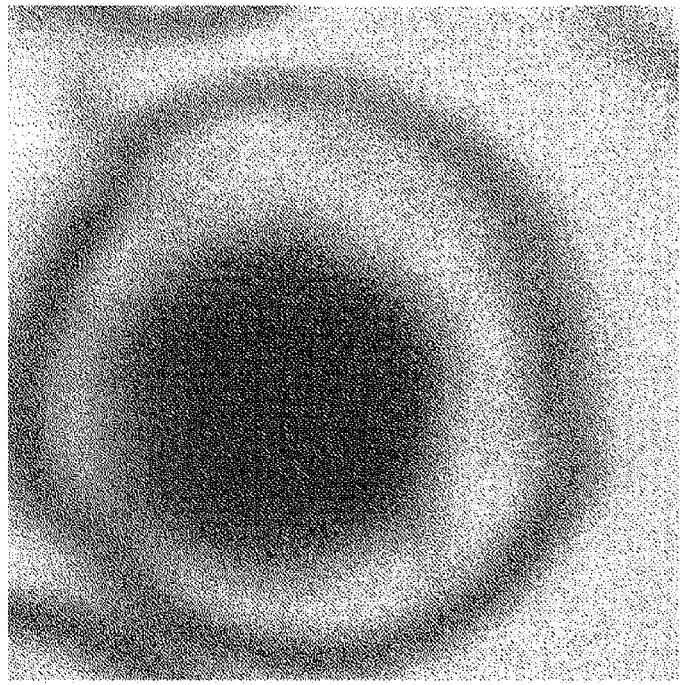
FIG. 3 illustrates an example of a positive-sample image expressed in gray scale.
Figure 4:
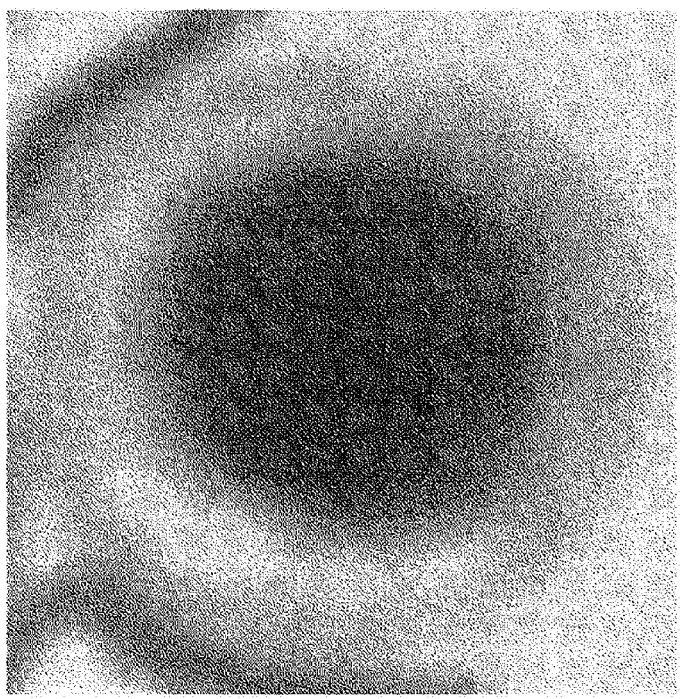
FIG. 4 illustrates an example of a negative-sample image expressed in gray scale.
Figure 5:
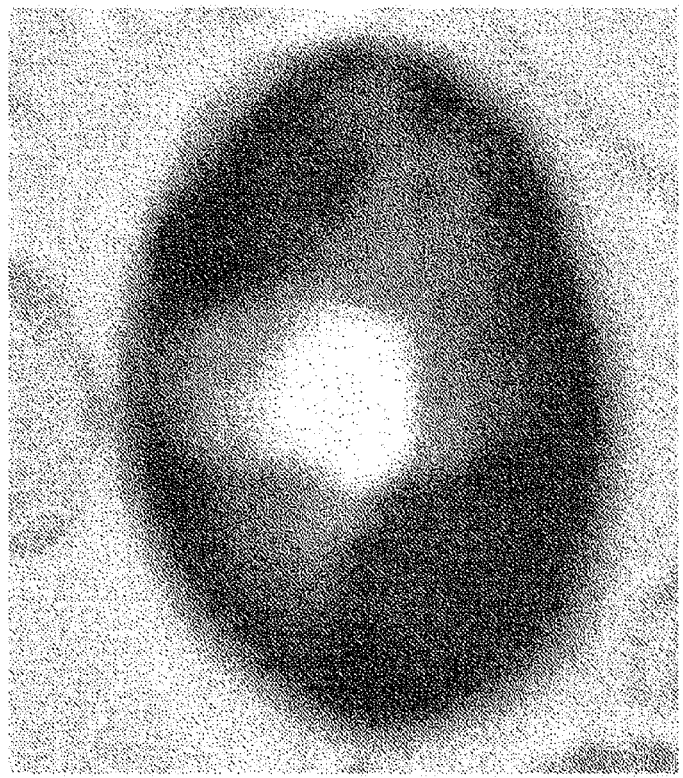
FIG. 5 illustrates another example of a negative-sample image expressed in gray scale.
Figure 6:
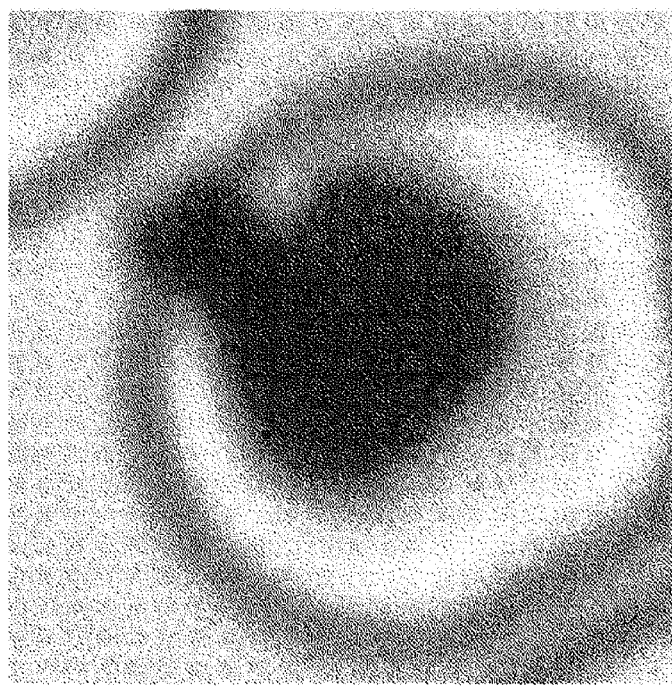
FIG. 6 illustrates another example of a negative-sample image expressed in gray scale.

In this embodiment, for example, the sample-image acquiring section 20 acquires an image including a target-cell image as a positive-sample image for generating a classifier and acquires an image not including a target-cell image as a negative-sample image for generating a classifier. The positive-sample image and the negative-sample image will collectively be referred to as "sample images" hereinafter. FIG. 3 illustrates an example of a positive-sample image expressed in gray scale. The positive-sample image shown in FIG. 3 includes a target-cell image in the middle thereof. FIG. 4 illustrates an example of a negative-sample image expressed in gray scale. The negative-sample image shown in FIG. 4 includes a white-blood-cell image in the middle thereof. FIG. 5 illustrates another example of a negative-sample image expressed in gray scale. The negative-sample image shown in FIG. 5 includes an image of foreign matter in the middle thereof. FIG. 6 illustrates another example of a negative-sample image expressed in gray scale. The negative-sample image shown in FIG. 6 includes a red-blood-cell image having foreign matter superimposed thereon in the middle thereof.

In this embodiment, for example, the captured-image acquiring section 22 acquires a captured image obtained as a result of the optical microscope 14 imaging a specimen targeted for determination of a possibility of inclusion of a target cell, that is, a specimen to be inspected. The captured image obtained by imaging the specimen to be inspected will be referred to as "specimen image" hereinafter.

In this embodiment, for example, the pixel extracting section 24 extracts nucleus-candidate pixels from pixels included in the specimen image based on a condition related to at least one of color and luminance. For example, when pixels with a pixel value larger than a predetermined value in the specimen image, that is, pixels within the specimen image, are binarized in accordance with a threshold value of the predetermined color or luminance, the pixel extracting section 24 extracts pixels that are darker than the predetermined color. However, the pixel extraction method by the pixel extracting section 24 is not limited to the above method. Pixels may be extracted based on a predetermined condition by using another method.

In this embodiment, for example, with regard to the pixels extracted by the pixel extracting section 24, the connected-pixel-group extracting section 26 extracts a connected pixel group constituted of a predetermined number of adjacent connected pixels or more.

Figure 7:
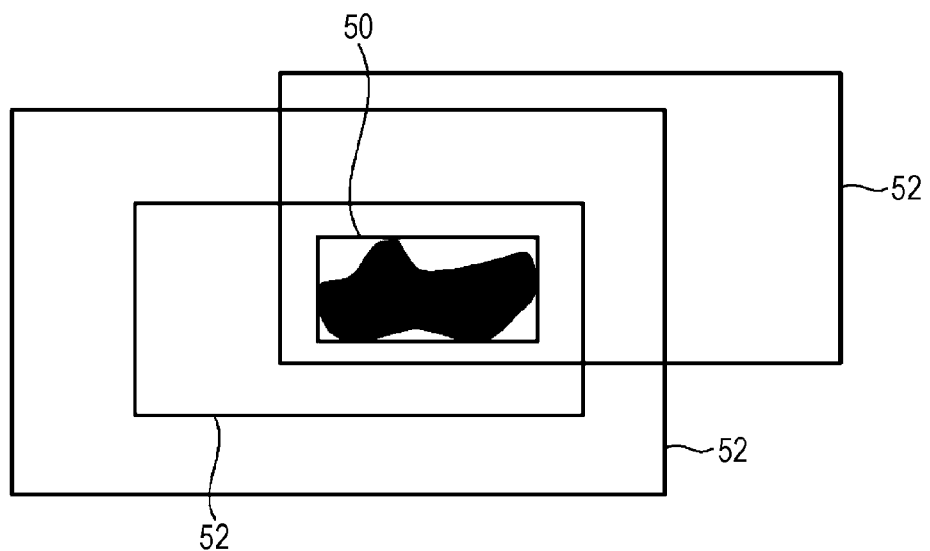
FIG. 7 schematically illustrates an example of the relationship between a nucleus candidate region and determination target regions.
Figure 8:
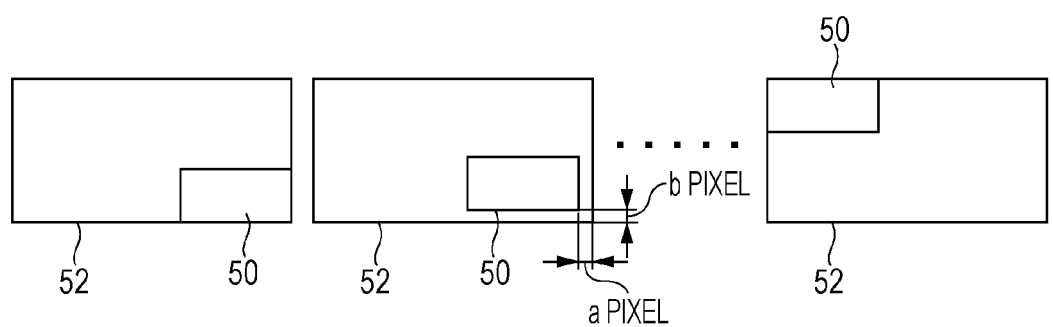
FIG. 8 illustrates an example of a method for setting the determination target regions.

In this embodiment, for example, the determination-target-region setting section 28 sets a region occupied by a circumscribed rectangle of the connected pixel group extracted by the connected-pixel-group extracting section 26 as a nucleus candidate region 50 (see FIG. 7). Then, the determination-target-region setting section 28 sets multiple determination target regions 52 that surround the nucleus candidate region (see FIG. 7). FIG. 7 schematically illustrates an example of the relationship between the nucleus candidate region 50 and the determination target regions 52. As shown in FIG. 7, in this embodiment, the determination-target-region setting section 28 sets the multiple determination target regions 52 having different sizes. Specifically, for example, the determination-target-region setting section 28 sets rectangular regions that surround the nucleus candidate region 50 and that have sizes twice, 2.5 times, 3 times, . . . , and n times, which is the predetermined maximum size, the longitudinal length and the transverse length of the nucleus candidate region 50 as the determination target regions 52. In this embodiment, the determination-target-region setting section 28 randomly sets the positions of the determination target regions 52 relative to the nucleus candidate region 50 based on, for example, random numbers. In FIG. 7, the nucleus candidate region 50 occupied by the circumscribed rectangle of the connected pixel group, and the determination target regions 52 having sizes that are twice, 2.5 times, and 3 times the longitudinal length and the transverse length of the nucleus candidate region 50 are shown as an example. Furthermore, the determination-target-region setting section 28 may set the determination target regions 52 within a range in which the nucleus candidate region 50 fits within the determination target regions 52. For example, as shown in FIG. 8, the determination-target-region setting section 28 may set a region in which the nucleus candidate region 50 is disposed at the lower right corner thereof, a region in which the nucleus candidate region 50 is shifted rightward by an a-pixel and downward by a b-pixel relative to the above region, a region in which the nucleus candidate region 50 is further shifted rightward by an a-pixel and downward by a b-pixel relative to the above region, . . . , and a region in which the nucleus candidate region 50 is disposed at the upper left corner thereof as the determination target regions 52 (a and b each being a predetermined integer). Moreover, for example, the determination-target-region setting section 28 may set a region that surrounds at least a portion of the connected pixel group extracted by the connected-pixel-group extracting section 26 as the nucleus candidate region 50.

In this embodiment, for example, with regard to each of the positive-sample image, the negative-sample image, and the image within each determination target region 52, the color-space decomposed-image generating section 30 generates decomposed images for individual components of a color space (e.g., RGB space, Lab space, or HSV space). For example, when generating decomposed images for individual RGB space components, the color-space decomposed-image generating section 30 generates at least one of an R-component image, a G-component image, and a B-component image.

In this embodiment, for example, the feature-amount calculating section 32 calculates an image feature amount for the images obtained by decomposing each sample image for individual color-space components or for images obtained by decomposing the image within each determination target region 52 for individual color-space components. The images obtained by decomposing each sample image for individual color-space components and the images obtained by decomposing the image within each determination target regions 52 for individual color-space components will be referred to as "calculation basis images". In this embodiment, for example, the feature-amount calculating section 32 determines an image feature amount based on luminance distribution within a region occupied by a calculation basis image. In this embodiment, for example, the feature-amount calculating section 32 calculates a cell Histogram-of-Oriented-Gradients (HOG) feature amount, which is different from the HOG feature amount in the related art. The difference between the HOG feature amount in the related art and the cell-HOG feature amount will be described later.

An example of how an image feature amount is calculated by the feature-amount calculating section 32 will be described below. First, for example, the feature-amount calculating section 32 calculates the direction of luminance gradient and the intensity of luminance gradient for each pixel within the region occupied by the calculation basis image. Then, the feature-amount calculating section 32 determines a predetermined number of partial regions, which are portions of the region occupied by the calculation basis image. The determined predetermined number of partial regions may overlap each other or may not overlap each other. Then, for each partial region, the feature-amount calculating section 32 divides the partial region into multiple cells. Subsequently, for each cell, the feature-amount calculating section 32 calculates an image feature amount expressing a luminance gradient determined based on luminance distribution within the partial region. In this case, for example, a luminance-gradient-direction histogram expressing the direction of a directed luminance gradient and the intensity of the luminance gradient is calculated. When calculating the histogram, for example, the feature-amount calculating section 32 sets angular ranges that are divided in units of a predetermined angle (e.g., in units of 20 degrees) counterclockwise from a reference direction (e.g., rightward direction). Accordingly, for example, 18 angular ranges (=360 degrees/20 degrees) are set.

Then, for each cell, the feature-amount calculating section 32 calculates a value indicating the intensity of the luminance gradient as a frequency in the histogram with respect to a bin in the histogram set in correspondence with the angular range to which the direction of the directed luminance gradient belongs. Subsequently, the feature-amount calculating section 32 calculates a histogram obtained by combining the luminance-gradient-direction histograms calculated for all the cells included in each partial region as a luminance-gradient-direction histogram of the partial region. Accordingly, a value obtained by aggregating the image feature amounts of the cells included in each partial region is determined as an image feature amount determined based on the luminance distribution within the partial region. Then, the feature-amount calculating section 32 calculates a histogram obtained by combining the histograms calculated for all the partial regions within the calculation basis image as a cell-HOG feature amount of the calculation basis image. Accordingly, a value obtained by aggregating the image feature amounts of the partial regions included in the calculation basis image is determined as an image feature amount determined based on the luminance distribution within the calculation basis image.

Alternatively, for example, the image processing device 12 may include multiple feature-amount calculating sections 32, such that the individual feature-amount calculating sections 32 may concurrently perform calculation of image feature amounts with respect to multiple calculation basis images (e.g., a G-component image and a B-component image) that are different from each other.

From among multiple components (e.g., bins in the histogram) constituting the image feature amount (e.g., cell-HOG feature amount in this embodiment) calculated by the feature-amount calculating section 32, the feature selecting section 34 selects components to be used for classification. For example, the feature selecting section 34 compares the histogram expressing the cell-HOG feature amount calculated based on the positive-sample image with the histogram expressing the cell-HOG feature amount calculated based on the negative-sample image and selects N components from among all components constituting the cell-HOG feature amount, starting sequentially from features with lower overlapping degrees. In this case, with regard to each partial region set in correspondence with the calculation basis image, different angular ranges may be selected as angular ranges to be used for classification. For example, if AdaBoost is used as a classifier to be described later, the feature selecting section 34 may use a learning algorithm to select an angular range. As a further alternative, the feature selecting section 34 may select multiple angular ranges designated by a user of the image processing device 12.

In this embodiment, for example, the classifier generating section 36 uses the multiple components, which have been selected by the feature selecting section 34 from among the multiple components constituting the image feature amount calculated based on the positive-sample image, as positive-sample learning data, and moreover, the classifier generating section 36 uses the multiple components constituting the image feature amount calculated based on the negative-sample image as negative-sample learning data, thereby generating a classifier. Then, the classifier generating section 36 outputs a parameter of the generated classifier to the classification-model storage section 38. Examples of the classifier used include Adaboost and support vector machine (SVM).

In this embodiment, for example, the classification-model storage section 38 stores information indicating a condition for the image feature amount machine-learned based on the luminance distribution with respect to the respective different color components in each of the positive-sample image and the negative-sample image. The information is to be used when determining a possibility that a target cell is included in each determination target region 52. In this embodiment, for example, the classification-model storage section 38 stores the parameter of the classifier generated by the classifier generating section 36. When Adaboost is used as a classifier, the classification-model storage section 38 stores, for example, the number of weak classifiers, the depth of a classification tree within a weak classifier, and a threshold value used at the time of classification.

Based on the multiple components, which have been selected by the feature selecting section 34 from among the multiple components constituting the image feature amount determined by the feature-amount calculating section 32 based on the luminance distribution of the calculation basis image with respect to the respective different color components within each determination target region 52, and the condition for the image feature amount stored in the classification-model storage section 38, the possibility determining section 40 determines a value indicating a possibility that a target cell is included in the determination target region 52. Then, the possibility determining section 40 associates the value indicating the possibility that a target cell is included in the determination target region 52 with classification information of the determination target region 52 and outputs the value as search-result information to the search-result-information storage section 42.

The search-result-information storage section 42 stores the aforementioned search-result information.

Based on the search-result information stored in the search-result-information storage section 42, the result-image generating section 44 generates an image expressing a search result and outputs the image to the display device 16. The display device 16 displays the image in response to reception of the image output from the result-image generating section 44.

An example of the flow of machine learning performed by the image processing device 12 according to this embodiment based on the positive-sample image and the negative-sample image will now be described with reference to a flowchart shown in FIG. 9.

First, the sample-image acquiring section 20 acquires multiple positive-sample images and multiple negative-sample images (S101). Then, the color-space decomposed-image generating section 30 generates images decomposed for individual color-space components for each of the positive-sample images and the negative-sample images acquired in the process indicated in S101 (S102). In this case, for example, the color-space decomposed-image generating section 30 generates a G-component image and a B-component image.

Then, with regard to each of the sample images acquired in the process indicated in S101, the feature-amount calculating section 32 calculates a cell-HOG feature amount for each of the G-component image and the B-component image generated in the process indicated in S102 as a cell-HOG feature amount corresponding to the sample image (S103). In this case, for example, the cell-HOG feature amount includes components of the intensity of luminance gradient for each of the 18 angular ranges with respect to the R-component image and components of the intensity of luminance gradient for each of the 18 angular ranges with respect to the G-component image. In other words, the cell-HOG feature amount includes a total of 36 components.

Then, based on the cell-HOG feature amount calculated from the positive-sample images in the process indicated in S103, the feature selecting section 34 generates positive-sample learning data (S104). Subsequently, based on the cell-HOG feature amount calculated from the negative-sample images in the process indicated in S103, the feature selecting section 34 generates negative-sample learning data (S105).

Then, based on the positive-sample learning data generated in the process indicated in S104 and the negative-sample learning data generated in the process indicated in S105, the feature selecting section 34 selects components to be used for generating a classifier from among the multiple components (e.g., 36 components) included in the cell-HOG feature amount (S106). In this case, for example, N angular ranges are selected from among multiple angular ranges included in the cell-HOG feature amount, starting sequentially from those with larger differences between the frequency of angular ranges in a histogram expressing the cell-HOG feature amount calculated based on the positive-sample images and the frequency of angular ranges in a histogram expressing the cell-HOG feature amount calculated based on the negative-sample images.

Subsequently, the classifier generating section 36 generates a classifier based on the multiple components with respect to the positive-sample learning data and the multiple components with respect to the negative-sample learning data, which have been selected in the process indicated in S106 (S107). Then, the classifier generating section 36 stores a parameter of the classifier generated in the process indicated in S107 into the classification-model storage section 38 as information expressing the condition for the image feature amount (S108), and the process indicated in this processing example ends.

Figure 10A:
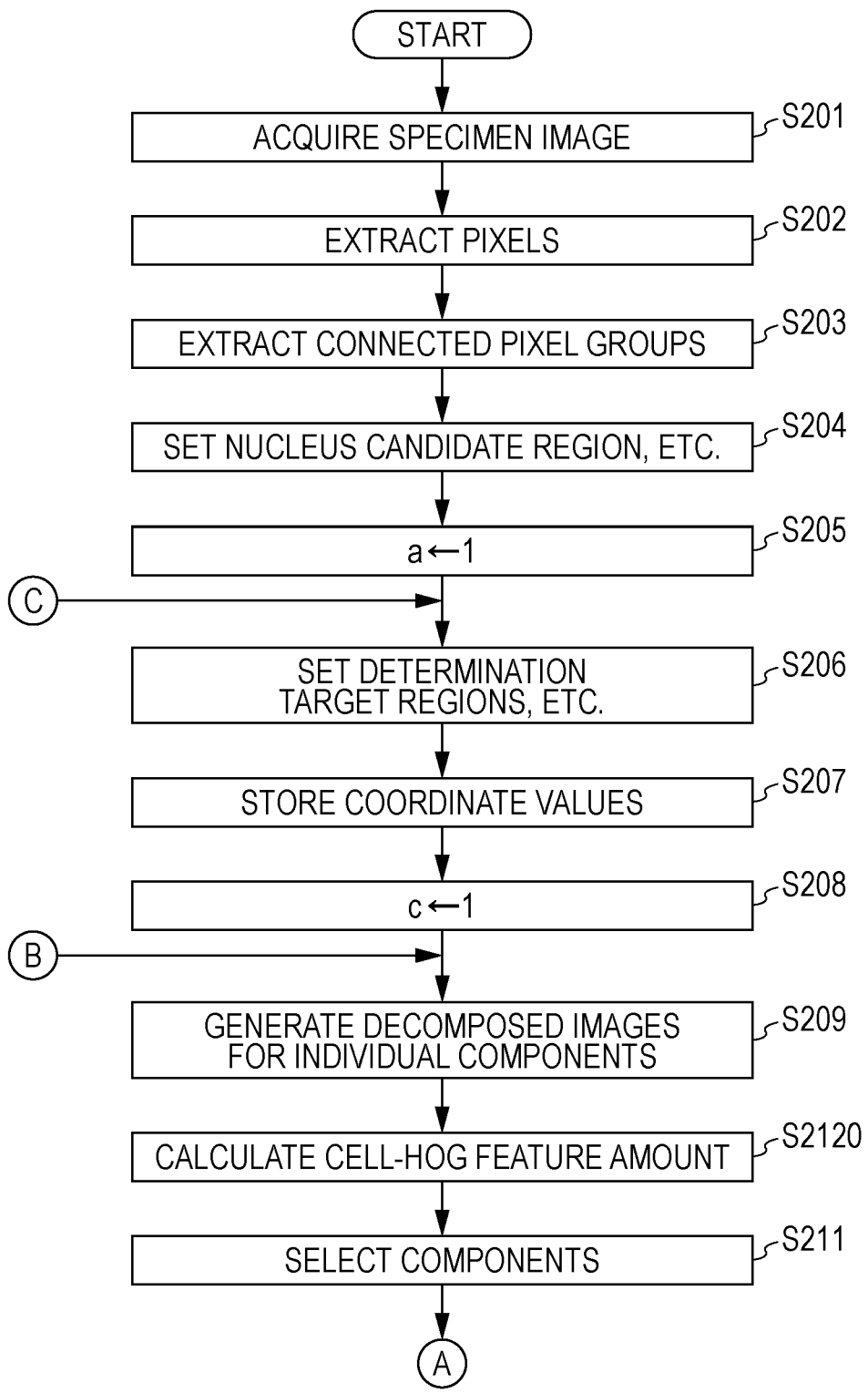
FIG. 10A is a flowchart illustrating an example of the flow of a process performed by the image processing device according to an embodiment of the present invention.
Figure 10B:
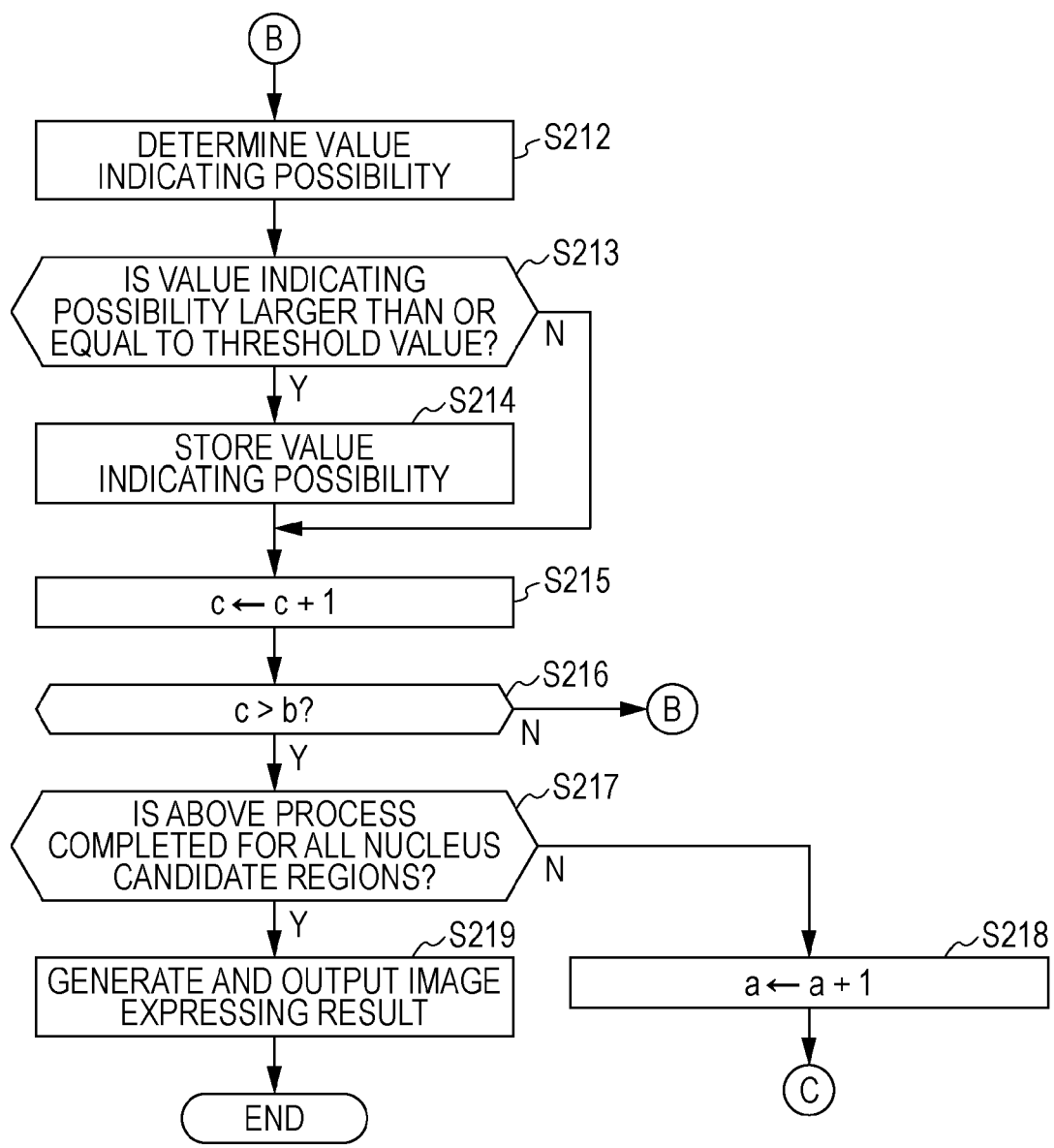
FIG. 10B is a flowchart illustrating an example of the flow of the process performed by the image processing device according to an embodiment of the present invention.

An example of the flow of a process performed by the image processing device 12 according to this embodiment for searching for a target cell within a specimen image will now be described with reference to flowcharts shown in FIGS. 10A and 10B.

First, the captured-image acquiring section 22 acquires a specimen image (S201). Then, the pixel extracting section 24 extracts pixels from the specimen image acquired in the process indicated in S201 based on a condition related to at least one of color and luminance (S202). Subsequently, from the pixels extracted in the process indicated in S202, the connected-pixel-group extracting section 26 extracts connected pixel groups each constituted of a predetermined number of adjacent connected pixels or more (S203). Then, the determination-target-region setting section 28 sets a circumscribed rectangle of each connected pixel group extracted in the process indicated in S203 as a nucleus candidate region, and associates different integers larger than or equal to 1 to the respective set nucleus candidate regions as nucleus-candidate-region labels (S204).

Then, the determination-target-region setting section 28 sets a value of a variable a to an initial value 1 (S205). Subsequently, the determination-target-region setting section 28 sets a predetermined number b of determination target regions 52 that surround each nucleus candidate region associated with the value of the variable a as a label, and associates different integers larger than or equal to 1 to the respective set determination target regions 52 as labels of the determination target regions 52 (S206). Then, with respect to a combination of the variable a and a variable c, the determination-target-region setting section 28 makes the search-result-information storage section 42 store coordinate values, within the specimen image, of four apexes of determination target regions 52 that are associated with the value of the variable c as a label and that surround the nucleus candidate region associated with the value of the variable a as a label in the process indicated in S206 (S207).

Subsequently, the color-space decomposed-image generating section 30 sets the value of the variable c to an initial value 1 (S208). Then, the color-space decomposed-image generating section 30 generates decomposed images for individual color-space components with respect to the image within each determination target region 52 associated with the value of the variable c as a label (S209). In this case, for example, the color-space decomposed-image generating section 30 generates a G-component image and a B-component image. Accordingly, in the process indicated in S209, images of types similar to those of the images generated in the process indicated in S102 are generated.

Then, the feature-amount calculating section 32 calculates a cell-HOG feature amount for each of the G-component image and the B-component image generated in the process indicated in S209 as a cell-HOG feature amount corresponding to each determination target region 52 associated with the value of the variable c as a label (S210). In this case, for example, the cell-HOG feature amount includes components of the intensity of luminance gradient for each of the 18 angular ranges with respect to the R-component image and components of the intensity of luminance gradient for each of the 18 angular ranges with respect to the G-component image. In other words, the cell-HOG feature amount includes a total of 36 components.

Then, the feature selecting section 34 selects the components selected in the process indicated in S106 from among the multiple components (e.g., 36 components) included in the cell-HOG feature amount calculated in the process indicated in S210 (S211).

Subsequently, based on the classifier generated in the process indicated in S107 and the components included in the cell-HOG feature amount and selected in the process indicated in S211, the possibility determining section 40 determines a value (e.g., probability) indicating a possibility that a target cell is included in the determination target region 52 corresponding to the cell-HOG feature amount (S212). In the process indicated in S212, for example, the possibility determining section 40 may determine a flag that indicates whether or not there is a possibility that a target cell is included in the determination target region 52 corresponding to the cell-HOG feature amount (e.g., a flag that indicates a value of 1 when there is a possibility and a value of 0 when there is no possibility). Furthermore, in the process indicated in S212, for example, the possibility determining section 40 may determine a value that expresses a possibility that a target cell is included in the determination target region 52 corresponding to the cell-HOG feature amount in percentage.

Then, the possibility determining section 40 checks whether or not the value indicating the possibility determined in the process indicated in S212 is larger than or equal to a predetermined threshold value (S213). If the value indicating the possibility determined in the process indicated in S212 is larger than or equal to the predetermined threshold value (S213: Y), the value indicating the possibility determined in the process indicated in S212 is associated with the value of the variable a and the value of the variable c and is stored as search-result information into the search-result-information storage section 42 (S214). If the value indicating the possibility determined in the process indicated in S212 is not larger than or equal to the predetermined threshold value (S213: N) or if the process indicated in S214 ends, the possibility determining section 40 increments the value of the variable c by 1 (S215). Then, the possibility determining section 40 determines whether or not the value of the variable c is larger than the aforementioned value of b (S216).

If the value of the variable c is not larger than the aforementioned value of b (S216: N), the processes from S209 and onward are executed again. If the value of the variable c is larger than the aforementioned value of b (S216: Y), the possibility determining section 40 checks whether or not the above process is completed for all of the nucleus candidate regions set in the process indicated in S205 (S217). If the above process is not completed for all of the nucleus candidate regions set in the process indicated in S205 (S217: N), the value of the variable a is incremented by 1 (S218), and the processes from S206 and onward are executed again. If the above process is completed for all of the nucleus candidate regions set in the process indicated in S205 (S217: Y), the result-image generating section 44 generates an image expressing the search result based on the search-result information stored in the process indicated in S214 and outputs the image to the display device 16 (S218). Then, the process indicated in this processing example ends.

The image generated in the process indicated in S218 may conceivably be of various types.

For example, the result-image generating section 44 may determine one or multiple determination target regions 52 corresponding to the value of the variable a and the value of the variable c stored as search-result information in the search-result-information storage section 42. Then, based on the coordinate values of the determination target regions 52 stored in the search-result-information storage section 42, the result-image generating section 44 may determine the positions, within the specimen image, of four apexes of the determined one or multiple determination target regions 52. Subsequently, the result-image generating section 44 may generate an image in which a rectangle surrounding the four apexes is disposed on the specimen image.

Alternatively, for example, the result-image generating section 44 may determine a region where multiple determination target regions 52 corresponding to the value of the variable a and the value of the variable c stored as search-result information in the search-result-information storage section 42 overlap each other. Then, the result-image generating section 44 may generate an image in which a graphic pattern surrounding this region is disposed on the specimen image.

As another alternative, the result-image generating section 44 may generate an image that expresses the combination of the value of the variable a and the value of the variable c stored as search-result information in the search-result-information storage section 42 in the form of a list.

In the HOG feature amount in the related art, a luminance-gradient histogram is normalized from partial region to partial region so as to achieve sturdiness against an illumination variation. In contrast, in the cell-HOG feature amount used in this embodiment, a value obtained by aggregating image feature amounts expressing luminance gradients (in this case, for example, luminance gradient intensities) determined based on luminance distribution within the partial regions without performing the normalization on each partial region is determined as an image feature amount determined based on luminance distribution within each sample image.

In this embodiment, since an image captured by the optical microscope 14 is the target and there is hardly any illumination variation, normalization does not necessarily need to be performed. Furthermore, for example, if a difference in luminance-gradient intensities near cell walls or nuclei serves as important information at the time of classification, such as when classifying the target-cell image as shown in FIG. 3 and the white-blood-cell image as shown in FIG. 4, a value obtained by aggregating the values of image feature amounts (in this case, for example, luminance-gradient intensities) expressing luminance gradients in a luminance-gradient-direction histogram without performing normalization on each partial region is used, so that the possibility of false detection, such as an evaluation result indicating a high possibility that a white-blood-cell image is a target cell or an evaluation result indicating a low possibility that a target-cell image is a target cell, is reduced.

Furthermore, when calculating the HOG feature amount in the related art, a non-directed luminance gradient is used instead of a directed luminance gradient so as to achieve sturdiness against target color and brightness variations. Therefore, in the HOG feature amount in the related art, a luminance gradient from a dark location toward a bright location and a luminance gradient from a bright location toward a dark location are treated equally. In contrast, in this embodiment, if a difference in tone and brightness inside and outside a cell is important information at the time of classification, such as when classifying the target-cell image as shown in FIG. 3 and the foreign-matter image as shown in FIG. 5, a directed luminance gradient is used so that the possibility of false detection, such as an evaluation result indicating a high possibility that a foreign-matter image is a target cell or an evaluation result indicating a low possibility that a target-cell image is a target cell, is reduced.

Furthermore, in this embodiment, the feature-amount calculating section 32 calculates an image feature amount with respect to images obtained by decomposing each sample image or an image within each determination target region 52 for individual color-space components. In the related art, an image feature amount is calculated with respect to an image obtained by converting a sample image or an image within each determination target region 52 into gray scale. When an image feature amount is calculated from a gray scale image as in the related art, it is difficult to perform classification based on the image feature amount between the target-cell image as shown in FIG. 3 and the non-target-cell red-blood-cell image having foreign matter superimposed thereon as shown in FIG. 6. In particular, with regard to the target-cell image as shown in FIG. 3 and the non-target-cell red-blood-cell image having foreign matter superimposed thereon as shown in FIG. 6, a difference in image feature amount calculated from a B-component image is larger than a difference in image feature amount calculated from a gray scale image. Therefore, in this embodiment, the possibility of false detection, such as an evaluation result indicating a high possibility that a non-target-cell red-blood-cell image having foreign matter superimposed thereon is a target cell or an evaluation result indicating a low possibility that a target-cell image is a target cell, is reduced.

The present invention is not limited to the above-described embodiment.

For example, the color-space decomposed-image generating section 30 does not have to generate decomposed images for individual color-space components with respect to each of the positive-sample image, the negative-sample image, and the image within each determination target region 52. The feature-amount calculating section 32 may calculate an image feature amount based on, for example, a gray-scale-converted positive-sample image, a gray-scale-converted negative-sample image, or a gray-scale-converted image within each determination target region 52.

Furthermore, for example, the feature-amount calculating section 32 may calculate a HOG feature amount in the related art in place of a cell-HOG feature amount. Based on the HOG feature amount in the related art, the possibility determining section 40 may determine a value indicating a possibility that a target cell is included in each determination target region 52.

Furthermore, for example, the feature selecting section 34 does not have to select components to be used for classification from among the multiple components constituting the image feature amount calculated by the feature-amount calculating section 32. Based on all of the multiple components constituting the image feature amount calculated by the feature-amount calculating section 32, the possibility determining section 40 may determine a value indicating a possibility that a target cell is included in each determination target region 52.

Furthermore, for example, when calculating an image feature amount, the feature-amount calculating section 32 may perform normalization on a luminance-gradient histogram from partial region to partial region.

Furthermore, the image processing device 12 according to this embodiment may be constituted of multiple housings. Moreover, the image processing device 12 according to this embodiment may include at least one of the optical microscope 14 and the display device 16 according to this embodiment. Furthermore, the specific character strings and numerical values in the specification and the specific character strings and numerical values in the drawings are examples and should not be limited to these character strings and numerical values.

According to an aspect of the above embodiments, there can be provided an image processing device comprising: a pixel extracting unit that extracts pixels serving as a candidate for a nucleus from pixels included in a captured image obtained by imaging a sample including a target cell having the nucleus; a connected-pixel-group extracting unit that extracts a connected pixel group constituted of a predetermined number of adjacent connected pixels or more from the pixels extracted by the pixel extracting unit; and a determining unit that determines a value indicating a possibility that the target cell is included within a region surrounding the connected pixel group extracted by the connected-pixel-group extracting unit, the value indicating the possibility being determined based on an image feature amount expressing a directed luminance gradient determined based on luminance distribution within the region surrounding the connected pixel group, wherein a luminance gradient from a dark location toward a bright location and a luminance gradient from a bright location toward a dark location are treated distinctively in the image feature amount expressing the directed luminance gradient.

According to another aspect of the above embodiments, there can be provided an image processing system comprising: an image processing device; an optical microscope that is connected to the image processing device; and a display device that is connected to the image processing device, wherein the optical microscope captures an image of a sample including a target cell having a nucleus, wherein the image processing device includes a pixel extracting unit that extracts pixels serving as a candidate for the nucleus from pixels included in the captured image obtained as a result of the optical microscope imaging the sample including the target cell having the nucleus, a connected-pixel-group extracting unit that extracts a connected pixel group constituted of a predetermined number of adjacent connected pixels or more from the pixels extracted by the pixel extracting unit, and a determining unit that determines a value indicating a possibility that the target cell is included within a region surrounding the connected pixel group extracted by the connected-pixel-group extracting unit, the value indicating the possibility being determined based on an image feature amount expressing a directed luminance gradient determined based on luminance distribution within the region surrounding the connected pixel group, wherein a luminance gradient from a dark location toward a bright location and a luminance gradient from a bright location toward a dark location are treated distinctively in the image feature amount expressing the directed luminance gradient, and wherein the display device displays an image expressing a position of the target cell in the captured image, the image being generated based on the value determined by the determining unit.

According to yet another aspect of the above embodiments, there can be provided a non-transitory computer readable medium storing a program for causing a computer to function as: a pixel extracting unit that extracts pixels serving as a candidate for a nucleus from pixels included in a captured image obtained by imaging a sample including a target cell having the nucleus; a connected-pixel-group extracting unit that extracts a connected pixel group constituted of a predetermined number of adjacent connected pixels or more from the pixels extracted by the pixel extracting unit; and a determining unit that determines a value indicating a possibility that the target cell is included within a region surrounding the connected pixel group extracted by the connected-pixel-group extracting unit, the value indicating the possibility being determined based on an image feature amount expressing a directed luminance gradient determined based on luminance distribution within the region surrounding the connected pixel group, wherein a luminance gradient from a dark location toward a bright location and a luminance gradient from a bright location toward a dark location are treated distinctively in the image feature amount expressing the directed luminance gradient.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An image processing device comprising:
   a pixel extracting unit that extracts pixels serving as a candidate for a nucleus from pixels included in a captured image obtained by imaging a sample including a target cell having the nucleus;
   a connected-pixel-group extracting unit that extracts a connected pixel group constituted of a predetermined number of adjacent connected pixels or more from the pixels extracted by the pixel extracting unit; and
   a determining unit that determines a value indicating a possibility that the target cell is included within a region surrounding the connected pixel group extracted by the connected-pixel-group extracting unit, the value indicating the possibility being determined based on a value obtained by aggregating image feature amounts expressing luminance gradients determined based on luminance distribution with respect to a blue component within a plurality of different partial regions included in the region surrounding the connected pixel group extracted by the connected-pixel-group extracting unit without performing normalization on each partial region, the value indicating the possibility being determined also based on a condition for an image feature amount machine-learned based on a value obtained by aggregating image feature amounts expressing luminance gradients determined based on luminance distribution with respect to a blue component within partial regions included in a region occupied by a sample image without performing normalization on each partial region.

2. An image processing system comprising:
   an image processing device;
   an optical microscope that is connected to the image processing device; and
   a display device that is connected to the image processing device,
   wherein the optical microscope captures an image of a sample including a target cell having a nucleus,
   wherein the image processing device includes
      a pixel extracting unit that extracts pixels serving as a candidate for the nucleus from pixels included in the captured image obtained as a result of the optical microscope imaging the sample including the target cell having the nucleus,
      a connected-pixel-group extracting unit that extracts a connected pixel group constituted of a predetermined number of adjacent connected pixels or more from the pixels extracted by the pixel extracting unit, and
      a determining unit that determines a value indicating a possibility that the target cell is included within a region surrounding the connected pixel group extracted by the connected-pixel-group extracting unit, the value indicating the possibility being determined based on a value obtained by aggregating image feature amounts expressing luminance gradients determined based on luminance distribution with respect to a blue component within a plurality of different partial regions included in the region surrounding the connected pixel group extracted by the connected-pixel-group extracting unit without performing normalization on each partial region, the value indicating the possibility being determined also based on a condition for an image feature amount machine-learned based on a value obtained by aggregating image feature amounts expressing luminance gradients determined based on luminance distribution with respect to a blue component within partial regions included in a region occupied by a sample image without performing normalization on each partial region, and
   wherein the display device displays an image expressing a position of the target cell in the captured image, the image being generated based on the value determined by the determining unit.

3. A non-transitory computer readable medium storing a program for causing a computer to function as:
   a pixel extracting unit that extracts pixels serving as a candidate for a nucleus from pixels included in a captured image obtained by imaging a sample including a target cell having the nucleus;
   a connected-pixel-group extracting unit that extracts a connected pixel group constituted of a predetermined number of adjacent connected pixels or more from the pixels extracted by the pixel extracting unit; and
   a determining unit that determines a value indicating a possibility that the target cell is included within a region surrounding the connected pixel group extracted by the connected-pixel-group extracting unit, the value indicating the possibility being determined based on a value obtained by aggregating image feature amounts expressing luminance gradients determined based on luminance distribution with respect to a blue component within a plurality of different partial regions included in the region surrounding the connected pixel group extracted by the connected-pixel-group extracting unit without performing normalization on each partial region, the value indicating the possibility being determined also based on a condition for an image feature amount machine-learned based on a value obtained by aggregating image feature amounts expressing luminance gradients determined based on luminance distribution with respect to a blue component within partial regions included in a region occupied by a sample image without performing normalization on each partial region.

4. An image processing device comprising:
   a captured-image acquiring unit that acquires a captured image obtained by imaging a sample including a target cell having a nucleus;
   a pixel extracting unit that extracts pixels serving as a candidate for the nucleus from pixels included in the captured image;
   a connected-pixel-group extracting unit that extracts a connected pixel group constituted of a predetermined number of adjacent connected pixels or more from the pixels extracted by the pixel extracting unit; and
   a determining unit that determines a value indicating a possibility that the target cell is included within a region surrounding at least a portion of the connected pixel group extracted by the connected-pixel-group extracting unit, the value indicating the possibility being determined based on an image feature amount determined based on luminance distribution with respect to a plurality of different color components within the region, the value indicating the possibility being determined also based on a condition for an image feature amount machine-learned based on luminance distribution with respect to a plurality of different color components within a sample image of the target cell.

5. The image processing device according to claim 4, wherein the determining unit determines the value indicating the possibility that the target cell is included within the region surrounding the connected pixel group extracted by the connected-pixel-group extracting unit based on an image feature amount expressing a directed luminance gradient determined based on luminance distribution within the region and also based on a condition for an image feature amount expressing a directed luminance gradient machine-learned based on luminance distribution within the sample image of the target cell.

6. The image processing device according to claim 4, wherein the value indicating the possibility that the target cell is included within the region surrounding the connected pixel group extracted by the connected-pixel-group extracting unit is determined by the determining unit based on a value obtained by aggregating image feature amounts expressing luminance gradients determined based on luminance distribution within a plurality of different partial regions included in the region surrounding the connected pixel group extracted by the connected-pixel-group extracting unit without performing normalization on each partial region, the value indicating the possibility being determined by the determining unit also based on a condition for an image feature amount machine-learned based on a value obtained by aggregating image feature amounts expressing luminance gradients determined based on luminance distribution within partial regions included in a region occupied by the sample image without performing normalization on each partial region.

7. The image processing device according to claim 4, wherein the value indicating the possibility that the target cell is included within the region surrounding the connected pixel group extracted by the connected-pixel-group extracting unit is determined by the determining unit based on image feature amounts determined based on luminance distribution with respect to green and blue components within the region, the value indicating the possibility being determined by the determining unit also based on a condition for an image feature amount machine-learned based on luminance distribution with respect to green and blue components within the sample image of the target cell.

8. An image processing system comprising:
an image processing device;
an optical microscope that is connected to the image processing device; and
a display device that is connected to the image processing device,
wherein the optical microscope captures an image of a sample including a target cell having a nucleus,
wherein the image processing device includes
a captured-image acquiring unit that acquires the captured image obtained as a result of the optical microscope imaging the sample including the target cell having the nucleus,
a pixel extracting unit that extracts pixels serving as a candidate for the nucleus from pixels included in the captured image,
a connected-pixel-group extracting unit that extracts a connected pixel group constituted of a predetermined number of adjacent connected pixels or more from the pixels extracted by the pixel extracting unit, and
a determining unit that determines a value indicating a possibility that the target cell is included within a region surrounding at least a portion of the connected pixel group extracted by the connected-pixel-group extracting unit, the value indicating the possibility being determined based on an image feature amount determined based on luminance distribution with respect to a plurality of different color components within the region, the value indicating the possibility being determined also based on a condition for an image feature amount machine-learned based on luminance distribution with respect to a plurality of different color components within a sample image of the target cell.

9. A non-transitory computer readable medium storing a program for causing a computer to function as:
a captured-image acquiring unit that acquires a captured image obtained by imaging a sample including a target cell having a nucleus;
a pixel extracting unit that extracts pixels serving as a candidate for the nucleus from pixels included in the captured image;
a connected-pixel-group extracting unit that extracts a connected pixel group constituted of a predetermined number of adjacent connected pixels or more from the pixels extracted by the pixel extracting unit; and
a determining unit that determines a value indicating a possibility that the target cell is included within a region surrounding at least a portion of the connected pixel group extracted by the connected-pixel-group extracting unit, the value indicating the possibility being determined based on an image feature amount determined based on luminance distribution with respect to a plurality of different color components within the region, the value indicating the possibility being determined also based on a condition for an image feature amount machine-learned based on luminance distribution with respect to a plurality of different color components within a sample image of the target cell.

* * * * *